Sept. 26, 1950 J. JANDASEK 2,523,907
FLUID TRANSMISSION
Filed Oct. 29, 1945
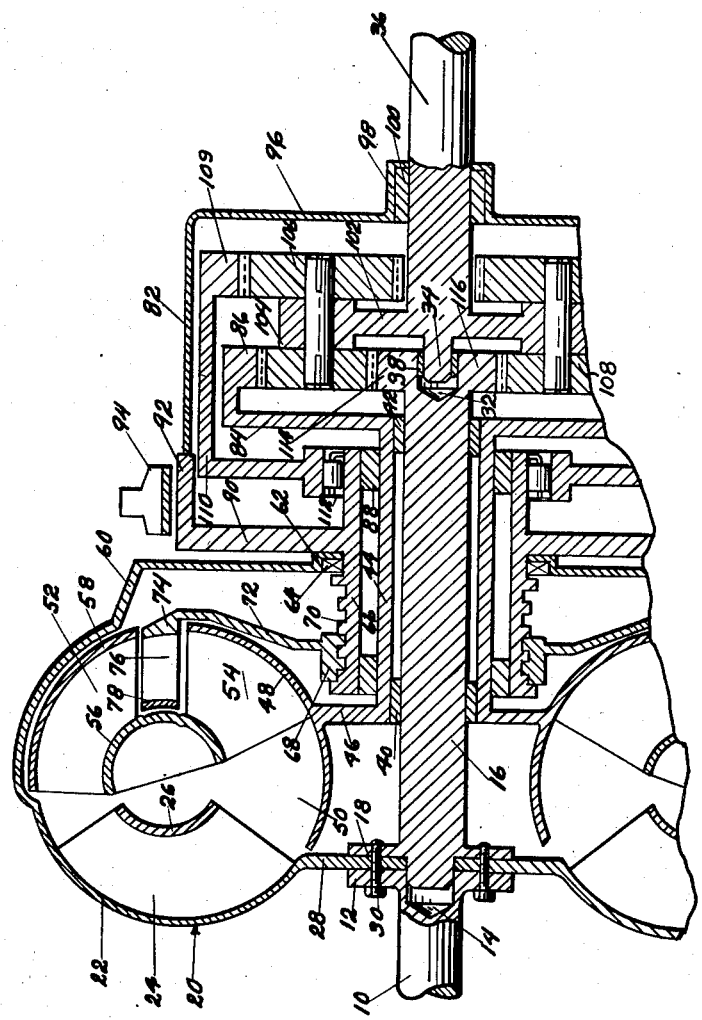
INVENTOR.
JOSEPH JANDASEK
BY
ATTORNEY Patented Sept. 26, 1950

2,523,907

UNITED STATES PATENT OFFICE 2,523,907

FLUID TRANSMISSION

Joseph Jandasek, Detroit, Mich., assignor to Bendix Aviation Corporation, Detroit, Mich., a corporation of Delaware.

Application October 29, 1945, Serial No. 625,303

4 Claims. (Cl. 74—688)

This invention relates to transmissions, and more particularly to combined fluid and mechanical transmissions of the two-path power flow type.

An object of the invention is to provide a two-path power flow fluid transmission employing a double planetary gearing system.

A further object of the invention is to combine a fluid transmission having an impeller, a turbine, and a reaction member, automatically movable into and out of the fluid circuit of the transmission so as to operate the transmission as a torque converter or as a fluid coupling, with a mechanical transmission operative to develope torque during all phases of operation of the fluid transmission, with part of the input energy flowing to the output side of the mechanism from the driving means directly to the driven means through a double planetary gearing system, and with part of the input energy from the driving shaft by-passing through the fluid transmission to the driven means through the planetary gearing system.

This invention differs from the conventional two-path power flow arrangement in that by the use of a double planetary system the guide wheel member may be locked for rotation with the turbine for fluid coupling operation of the transmission.

Thus, when torque conversion is not required after the speed of the turbine becomes approximately equal to that of the impeller, the guide wheel member upon withdrawing from the turbine chamber proper is not slowly dragged in rotation by the turbulent fluid. Instead, through the use of a double planetary gearing system, the guide wheel member is caused to rotate at the same speed as the turbine, thus reducing the energy loss and increasing the efficiency of the two-path power flow fluid type transmission.

The single figure is a vertical sectional view of a two-path power flow fluid transmission embodying the invention.

Referring to the drawing, 10 represents a crankshaft having a conventional flange 12 and a concentrically disposed recess 14 into which is fitted a driving shaft 16 having a flange 18.

An impeller, indicated generally at 20, includes an outer shroud or a rotatable housing 22 having arranged thereon a plurality of equi-spaced blades 24 supporting an inner shroud 26, and a web 28 securely fastened as by bolts 30 between flanges 12 and 18.

The driving shaft 16 has a concentrically disposed recess 32 into which is fitted a pilot 34 of a driven shaft 36. As shown, the pilot 34 is supported on a suitable bearing 38.

Supported on the driving shaft 16 by bearings 40, 42 is a concentric sleeve 44 having thereon at one end a web 46 supporting a turbine indicated generally at 48. The turbine provides in conjunction with the impeller 20 a toroidal chamber 50. The turbine is of the two-stage type including a set of vanes 52 constituting the first stage of the turbine, and another set of vanes 54 constituting the second stage of the turbine. The two stages of the turbine are spaced apart. The vanes 54 are arranged on the shroud 48, and they support an inner shroud 56 which in turn supports the vanes 52, and the vanes 52 are also attached to a shroud 58.

The turbine is enclosed by a rotatable housing or shell 60 integral with the shroud 22 of the impeller and the housing has a bearing support 62 receiving a bearing 64, supported on a sleeve 66 having thereon a carrier 68 mounted for travel on threads 70 on the sleeve 66.

The carrier 68 supports a reaction member 72 having an outer shroud 74 supporting a plurality of equi-spaced reaction vanes 76 which in turn support an inner shroud 78.

The web 46 is supported by a concentrically disposed sleeve 44 extended into a transmission housing generally indicated as at 82, and supports a drum 84 having thereon a ring gear 86.

Sleeve 44 has thereon bearings 88 for support of the sleeve 66 which carries a flange 90 forming a part of the transmission enclosure, and the flange 90 has a braking surface 92 for the reception of a friction element or a brake shoe 94 adapted to be activated in any conventional manner.

The transmission enclosure further includes a housing shell 96 having a bearing support 98 for the reception of bearing 100, supported on driven shaft 36.

A flange 102 on the driven shaft 36 has an enlarged rim 104 which supports for rotation two sets of pinions 106 and 108.

The pinion 106 is in mesh with a ring gear 109 on the drum 110 connected through a one-way clutch 112 to the sleeve 66 projecting into the transmission housing 82.

The pinions 108 mesh with ring gear 86 and a sun gear 114 on the flange 116 of the driving shaft 16.

When starting or at heavy load, the brake 94 is applied, to hold the sleeve 66. Torque is then transmitted from a prime mover through the crankshaft 10 to the driving shaft 16, resulting in driving the impeller 20 and thus energizing fluid in the toroidal chamber 50. The energy of the fluid is absorbed by the vanes 52 and 54, constituting the first and second stages of the turbine 48, and on the faces of the vanes 76 of the reaction member 72, resulting in rotation of the turbine 48 and a rapid movement of the reaction member on the threaded portion 70 of the sleeve 66, completely introducing the reaction vanes 76 into the toroidal chamber 50 so as to provide for torque multiplication.

At the same time, power is transmitted by the drive shaft 16 to the sun gear 114 in mesh with the pinions 108, and also to the pinions 106 in mesh with the ring gear 109. This tends to rotate the ring gear 109 in the opposite direction, but it is prevented from rotating by the one-way clutch 112 and the brake 94 engaging the drum 92. The ring gear 109 when stationary, acts as a mechanical reaction member and torque multiplicator giving the driven shaft 36 more turning force at slow speeds.

Power flows from the turbine 48 through the sleeve 44 to the ring gear 86, which is driven forward at a slow speed. The sun gear 114 rotating at a predetermined constant speed and the ring gear 86 rotating at a slow speed at the beginning of the turbine rotation, combine to cause the pinion gear 108 to transmit a moderate speed of rotation to the driven shaft 36.

As the turbine 48 picks up power from the impeller 20, the ring gear 86 moves forward faster than the gear system drives it. This, in turn, causes the ring gear 109 to now move forward disengaging the one-way clutch 112.

When the turbine speed approaches the impeller speed, the ring gear 86 and the sun gear 114 approach the same speed and the system nears a one-to-one ratio.

As the speed of the turbine approaches the speed of the impeller, the fluid impinging formerly on the faces of the guide member vanes 76 now strike vanes 76 on the backs thereof, causing the guide member 72 to travel out of the turbine chamber along the threads 70 of the sleeve 66. When this occurs, the brake 94 is manually released, causing the guide wheel member 72 to revolve at the speed of the turbine, thus allowing no fluid drag or fluid energy decreasing resistance such as would be offered by a stationary guide wheel member.

While this invention has been described in connection with certain specific embodiments, the principle involved is susceptible of numerous other applications that will readily occur to persons skilled in the art. The invention is, therefore to be limited only as indicated by the scope of the appended claims.

Having thus described the various features of the invention, what I claim as new and desire to secure by Letters Patent is:

1. A transmission comprising a fluid transmission and a mechanical transmission, a reaction member for the fluid transmission, means for holding the reaction member, a mechanical transmission, a reaction member therefor, means connecting the reaction member of the mechanical transmission to the reaction member of the fluid transmission so that the reaction member of the mechanical transmission may be held against rotation during one phase of operation of the transmission while the reaction member of the fluid transmission remains held against rotation.

2. A transmission comprising driving and driven shafts, a planetary gear system, including a sun gear, two sets of planet pinions and two orbit gears connecting the shafts, a fluid transmission including a primary member connected to the sun gear of the system, a secondary member connected to one of the orbit gears of the system, and a reaction member, means for holding the reaction member of the fluid transmission, and means for holding the other orbit gear of the planetary gear system effective only upon holding the reaction member of the fluid transmission.

3. A transmission comprising driving and driven shafts, a double planetary gear system including two sets of planet pinions and two orbit gears connecting the shafts, a fluid transmission including a primary member connected to the driving shaft, a secondary member connected to one of the orbit gears, and a reaction member, means for holding the reaction member and means for holding the other orbit gear effective only when holding the reaction member.

4. A transmission comprising driving and driven shafts, a double planetary gear system including two sets of planet pinions and two orbit gears connecting the shafts, a fluid transmission including a primary member, a secondary member and a reaction member, means connecting the primary member to the driving shaft, means connecting the secondary member to one of the orbit gears of the planetary gear system, means for holding the reaction member, and means for holding the other orbit gear of the planetary gear system effective only when holding the reaction member.

JOSEPH JANDASEK.

REFERENCES CITED

The following references are of record in the file of this patent:

UNITED STATES PATENTS

| Number | Name | Date |
|---|---|---|
| 2,015,300 | Dell | Sept. 24, 1935 |
| 2,112,016 | Dell | Mar. 22, 1938 |
| 2,143,312 | Griswold | Jan. 10, 1939 |
| 2,158,557 | Lammeren | May 16, 1939 |
| 2,291,120 | Tipton | July 28, 1942 |
| 2,293,358 | Pollard | Aug. 18, 1942 |
| 2,301,451 | Pollard | Nov. 10, 1942 |
| 2,312,849 | Pollard | Mar. 2, 1943 |
| 2,365,879 | Jandasek | Dec. 26, 1944 |